US009800127B2

(12) United States Patent
Wang et al.

(10) Patent No.: US 9,800,127 B2
(45) Date of Patent: Oct. 24, 2017

(54) RECIPROCATING ELECTRIC MOTOR

(71) Applicant: Sheng-Lian Lin, Taoyuan (TW)

(72) Inventors: Chin-Chao Wang, Kaohsiung (TW);
Mei-Ling Chang, Kaohsiung (TW);
Yuh-Suiang Wang, Kaohsiung (TW)

(73) Assignee: Sheng-Lian Lin, Taoyuan (TW)

( * ) Notice: Subject to any disclaimer, the term of this patent is extended or adjusted under 35 U.S.C. 154(b) by 246 days.

(21) Appl. No.: 14/860,150

(22) Filed: Sep. 21, 2015

(65) Prior Publication Data

US 2016/0013711 A1    Jan. 14, 2016

Related U.S. Application Data

(63) Continuation-in-part of application No. 13/652,833, filed on Oct. 16, 2012, now abandoned.

(30) Foreign Application Priority Data

Aug. 9, 2012    (TW) .............................. 101128744 A

(51) Int. Cl.
| | | |
|---|---|---|
| H02K 41/00 | (2006.01) | |
| H02K 33/00 | (2006.01) | |
| H02K 37/00 | (2006.01) | |
| H02K 33/12 | (2006.01) | |
| H02K 3/28 | (2006.01) | |
| F04B 35/00 | (2006.01) | |
| H02K 41/03 | (2006.01) | |
| F04B 35/04 | (2006.01) | |

(52) U.S. Cl.
CPC ............. *H02K 33/12* (2013.01); *F04B 35/00* (2013.01); *F04B 35/045* (2013.01); *H02K 3/28* (2013.01); *H02K 41/03* (2013.01)

(58) Field of Classification Search
CPC ........... H02K 21/14; H02K 41/03; H02K 1/27
USPC ......... 310/12.12, 12.13, 12.21, 12.22, 12.23, 310/12.24, 24, 49.18, 49.29, 49.31, 49.35, 310/156.35, 156.37, 216.015, 216.059
See application file for complete search history.

(56) References Cited

U.S. PATENT DOCUMENTS 4,353,220 A      10/1982   Curwen et al.
4,607,197 A  *   8/1986    Conrad ................. H02K 37/04
                                                        310/12.14
(Continued)

FOREIGN PATENT DOCUMENTS

| CN | 102594079 | | 7/2012 | |
|---|---|---|---|---|
| DE | GB 2373643 A | * | 9/2002 | ............. H02K 15/03 |
| GB | 2 373 643 A | | 9/2002 | |

*Primary Examiner* — Jose Gonzalez Quinones
(74) *Attorney, Agent, or Firm* — Chieh-Mei Wang

(57) ABSTRACT

A reciprocating electric motor includes a housing, a stator member disposed in the housing, a reciprocating armature movable relative to the housing, and a controller. The stator member includes first and second. electromagnet units opposite to each other in a longitudinal direction of the housing. The reciprocating armature includes first and second elongated pole units each of which is moved into register with a corresponding one of the first and second electromagnet units when the corresponding one of the first and second electromagnet units is energized. The controller is configured to alternately energize the first and second electromagnet units to cause reciprocating movement of the reciprocating armature.

9 Claims, 12 Drawing Sheets

(56) References Cited

U.S. PATENT DOCUMENTS 4,750,871 A      6/1988  Curwen
5,652,493 A  *   7/1997  Hendershot, Jr. .... H02K 19/103
                                                318/400.17

* cited by examiner

RECIPROCATING ELECTRIC MOTOR

CROSS-REFERENCE TO RELATED APPLICATION

This application is a continuation-in-part (CIP) of U.S. patent application Ser. No. 13/652,333, filed on Oct. 16, 2012, which claims priority of Taiwanese application no. 101128744, filed on Aug. 9, 2012.

FIELD

The disclosure relates to a motor, more particularly to a reciprocating electric motor.

BACKGROUND

U.S. Pat. No. 4,607,197 discloses a linear and rotary electromagnetic device which is adapted as a linear and rotary stepper or stepper motor. A cylindrical movable member or armature is provided, which is mounted for both axial movement and angular movement. The armature member has teeth on its surface formed in both axial rows and circumferential alignment or rows. Stator means haying poles with windings associated with the poles is provided, the stator means having a central opening in which the movable armature member is mounted for axial and angular movement. By energizing certain angularly spaced windings, the movable armature member may be caused to rotate. By energizing axially spaced windings, the movable member of the armature can be caused to move axially. Simultaneous angular and axial movement is achieved by energizing appropriate windings.

GB 2373643 A discloses a method of manufacturing a stator for a linear-motion electrical machine. The stator comprises a plurality of stator units. Each stator unit comprise a plurality of stator poles equally angularly spaced around the circumference of the unit, and an identical number of permanent magnets which are fastened on successive stator poles and magnetized with alternating polarity. The stator units are joined axially to one another in such a way that permanent magnets of alternating polarity lie adjacent to one another on axially mutually aligned stator poles of the stator units. The stator units are prefabricated separately from one another, including the fitting and magnetization of the permanent magnets, and are then put together to form the stator.

SUMMARY

Therefore, an object of the disclosure is to provide a new reciprocating electric motor which has a simple configuration and which produces low noise when operated.

According to the disclosure, a reciprocating electric motor includes a housing, a stator member, a reciprocating armature, and a controller. The housing has a tubular body extending along a central axis in a longitudinal direction to terminate at front and rear ends. The stator member is disposed in the tubular body and includes a front stator core, a rear stator core, a coupling stator core, a front coil winding unit, and a rear coil winding unit. The front stator core is disposed proximate to the front end, and has a front tubular segment surrounding the central axis, and a front magnetic pole unit which is disposed on an inner surface of the front tubular segment, and which extends in the longitudinal direction. The rear stator core is disposed proximate to the rear end, and has a rear tubular segment surrounding the central axis, and a rear magnetic pole unit which is disposed on an inner surface of the rear tubular segment, and which extends in the longitudinal direction. The rear magnetic pole unit is angularly displaced from the front magnetic pole unit relative to the central axis. The coupling stator core has a ring segment which is disposed between the front and rear tubular segments and which surrounds the central axis, and first and second magnetic pole units which are disposed on an inner surface of the ring segment, and which are angularly displaced from each other such that the first and second magnetic pole units are in alignment with the front and rear magnetic pole units, respectively. The front coil winding unit is wound around the front magnetic pole unit and the first magnetic pole unit to form a first electromagnet unit which can be energized to a first energized state. The rear coil winding unit is wound around the rear magnetic pole unit and the second magnetic pole unit to form a second electromagnet unit which can be energized to a second energized state. The reciprocating armature includes front and rear end segments, and an armature segment which is disposed in the tubular body and between the front and rear end segments, and which is formed from a magnetically attractive material. The front end segment extends forwardly from the armature segment to terminate at a front journal region which is journaled forwardly of the front end of the tubular body so as to permit the front end segment to move relative to the housing. The rear end segment extends rearwardly from the armature segment to terminate at a rear journal region which is journaled rearwardly of the rear end of the tubular body so as to permit the rear end segment to move relative to the housing. The armature segment has a central body, a first elongated pole unit, and a second elongated pole unit. The central body extends along the central axis. The first elongated pole unit extends in the longitudinal direction and radially from the central body, and is configured such that when the first electromagnet unit is energized to the first energized state, the first elongated pole unit is moved into register with the first electromagnet unit by virtue of a magnetic attraction of the first electromagnet unit. The second elongated pole unit extends in the longitudinal direction and radially from the central body, and is angularly displaced from the first elongated pole unit. The second elongated pole unit is configured such that when the second electromagnet unit is energized to the second energized state, the second elongated pole unit is moved into register with the second electromagnet unit by virtue of a magnetic attraction of the second electromagnet unit. The controller is configured to alternately energize the first and second electromagnet units to cause reciprocating movement of the reciprocating armature.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
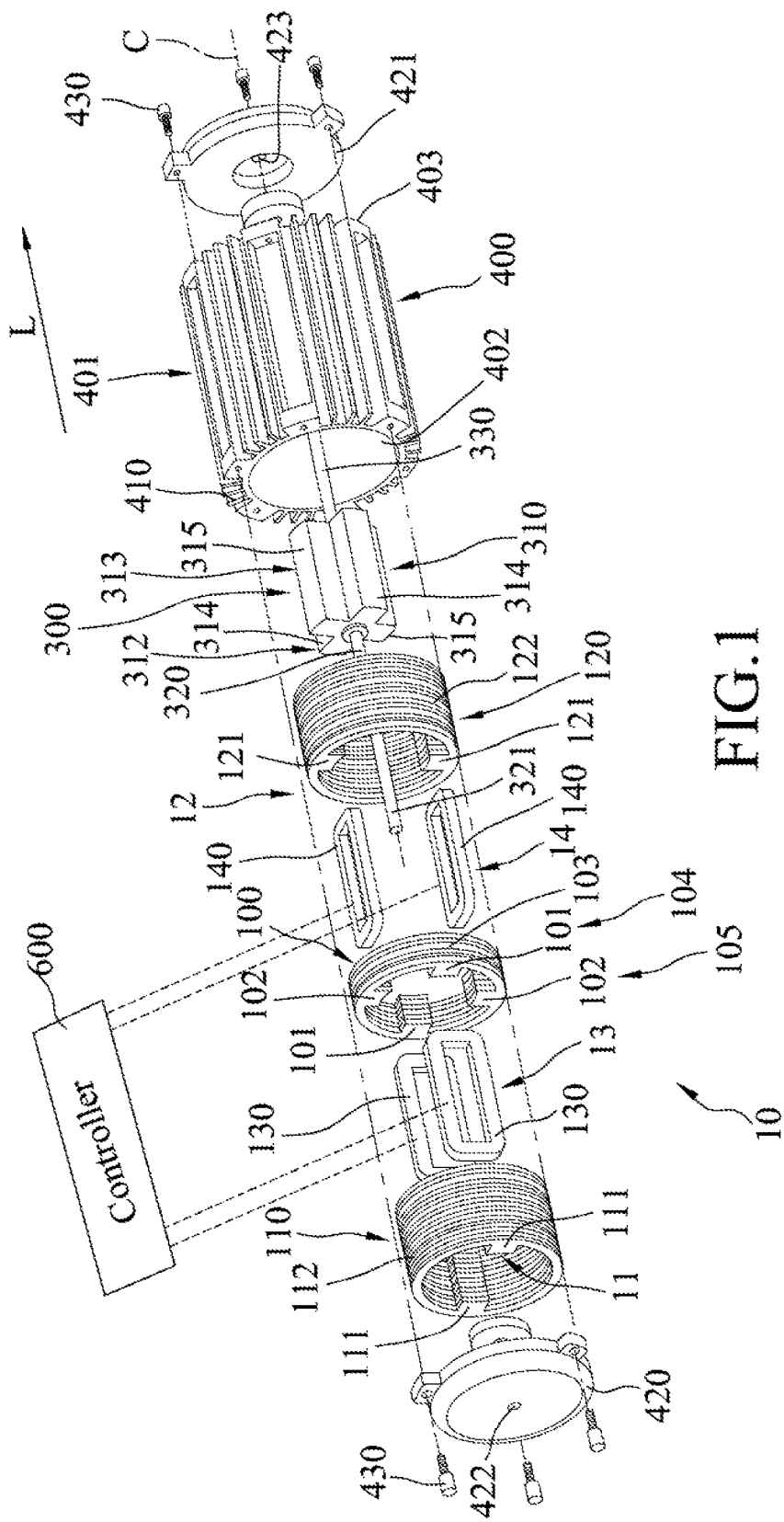
FIG. 1 is an exploded perspective view of a reciprocating electric motor according to a first embodiment of the disclosure.

Before the disclosure is described in greater detail, it should be noted that like elements are denoted by the same reference numerals throughout the disclosure.

As shown in FIG. 1, a reciprocating electric motor according to a first embodiment of this disclosure includes a stator member 10, a reciprocating armature 300, a housing 400, and a controller 600.

Figure 3A:
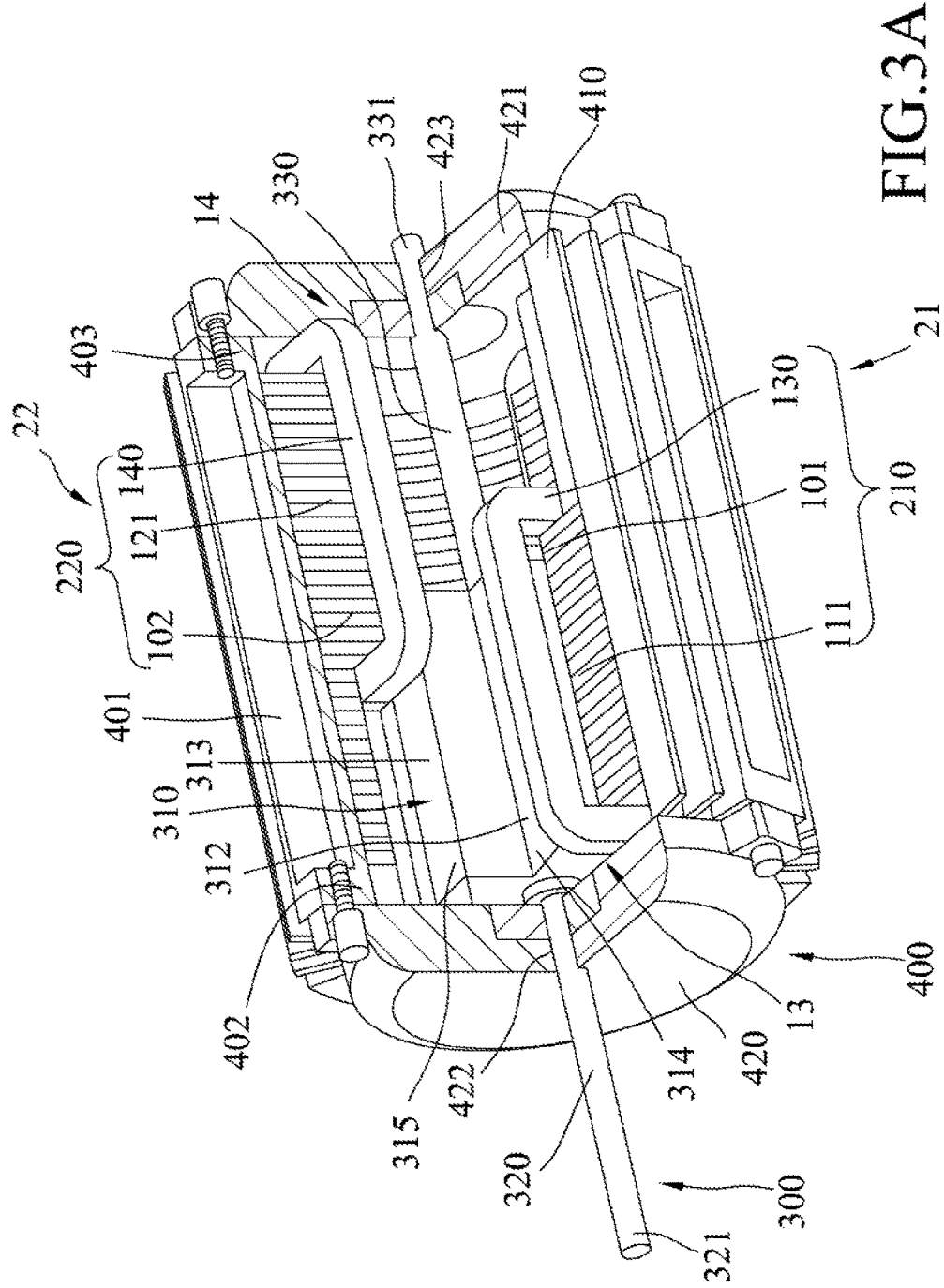
FIG. 3A is a perspective, partially cut-out view of the reciprocating electric motor in which a first elongated pole unit is in register with a first electromagnet unit.

The housing 400 has a tubular body 401 extending along a central axis (C) in a longitudinal direction (L) to terminate at front and rear ends 402, 403 (see also FIG. 3A). In this embodiment, the housing 400 further has front and rear end caps 420, 421, and a plurality of fins 410. The front and rear end caps 420, 421 are secured to the tubular body 401 using screws 430 so as to cover the front and rear ends 402, 403 of the tubular body 401, respectively. The fins 410 are disposed on an outer surface of the tubular body 401 for heat dissipation, extend in the longitudinal direction (L), and are displaced from one another in a circumferential direction.

The stator member 10 is disposed in the tubular body 401, and includes a front stator core 110, a rear stator core 120, a coupling stator core 100, a front coil winding unit 13, and a rear coil winding unit 14.

The front stator core 110 is disposed proximate to the front end 402, and has a front tubular segment 112 surrounding the central axis (C), and a front magnetic pole unit 11. The front magnetic pole unit 11 is disposed on an inner surface of the front tubular segment 112, and extends in the longitudinal direction (L).

The rear stator core 120 is disposed proximate to the rear end 403, and has a rear tubular segment 122 surrounding the central axis (C), and a rear magnetic pole unit 12. The rear magnetic pole unit 12 is disposed on an inner surface of the rear tubular segment 122, and extends in the longitudinal direction (L). The rear magnetic pole unit 12 is angularly displaced from the front magnetic pole unit 11 relative to the central axis (C).

The coupling stator core 100 has a ring segment 103 and first and second magnetic pole units 104, 105. The ring segment 103 is disposed between the front and rear tubular segments 112, 122, and surrounds the central axis (C). The first and second magnetic pole units 104, 105 are disposed on an inner surface of the ring segment 103, and are angularly displaced from each other such that the first and second magnetic pole units 104, 105 are in alignment with the front and rear magnetic pole units 11, 12, respectively. In this embodiment, the first and second magnetic pole units 104, 105 are also in contact with the front and rear magnetic pole units 11, 12, respectively.

The front stator core 110, the rear stator core 120, and the coupling stator core 100 may be made of iron, silicon steel or any other magnetically permeable material.

In addition, the front stator core 110, the rear stator core 120, and the coupling stator core 100 may be formed into one piece. Alternatively, the coupling stator core 100 and one of the front and rear stator cores 110, 120 are formed into one piece.

The front coil winding unit 13 is wound around the front and first magnetic pole units 11, 104 to form a first electromagnet unit 21 (see FIGS. 1, 3A, and 3B) which can be energized to a first energized state.

The rear coil winding unit 14 is wound around the rear and second magnetic pole units 12, 105 to form a second electromagnet unit 22 (see FIGS. 1, 3A, and 3B) which can be energized to a second energized state.

The reciprocating armature 300 includes front and rear end segments 320, 330, and an armature segment 310. The armature segment 310 is disposed in the tubular body 401 and between the front and rear end segments 320, 330, and is formed from a magnetically attractive material, such as iron, silicon steel, a permanent magnet, a magnetically permeable material, etc. The front and rear end segments 320, 330 are made of a non-magnetically attractive material. The front end segment 320 extends forwardly from the armature segment 310 to terminate at a front journal region 321 which is journaled forwardly of the front end 402 of the tubular body 401 so as to permit the front end segment 321 to move relative to the housing 400. The rear end segment 330 extends rearwardly from the armature segment 310 to terminate at a rear journal region 331 (see also FIG. 3A) which is journaled rearwardly of the rear end 403 of the tubular body 401 so as to permit the rear end segment 330 to move relative to the housing 400. In this embodiment, the front end cap 420 has a front central hole 422 configured to permit the front journal region 321 to be journaled in the front end cap 420. The rear end cap 421 has a rear central hole 423 configured to permit the rear journal region 331 to be journaled in the rear end cap 421.

Figure 2:
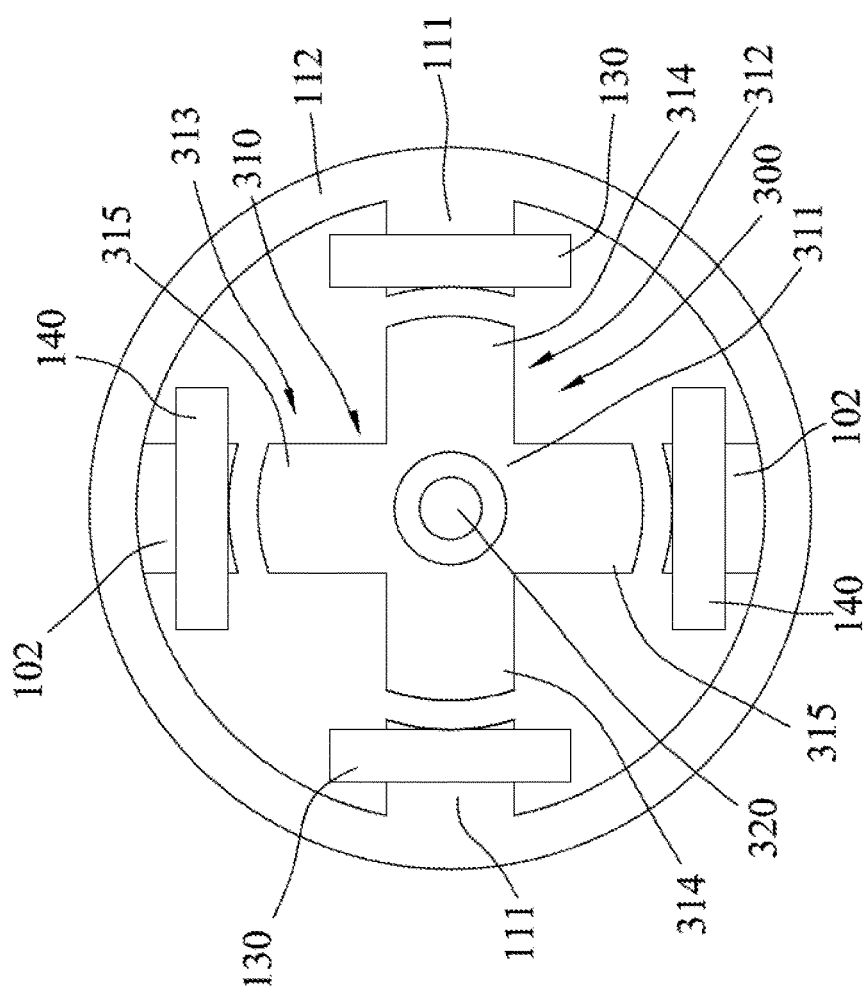
FIG. 2 is a schematic front view of the reciprocating electric motor with a housing omitted.

As shown in FIGS. 1 and 2, the armature segment 310 has a central body 311, and first and second elongated pole units 312, 313. The central body 311 extends along the central axis (C).

The first elongated pole unit 312 extends in the longitudinal direction (L) and radially from the central body 311, and is configured such that when the first electromagnet unit 21 is energized to the first energized state, the first elongated pole unit 312 is moved into register with the first electromagnet unit 21 (see FIG. 3A) by virtue of the magnetic attraction of the first electromagnet unit 21. At this point, the armature segment 310 is in a forward position.

The second elongated pole unit 313 extends in the longitudinal direction (L) and radially from the central body 311, and is angularly displaced from the first elongated pole unit 312. The second elongated pole unit 313 is configured such that when the second electromagnet unit 22 is energized to the second energized state, the second elongated pole unit 313 is moved into register with the second electromagnet unit 22 (see FIG. 3B) by virtue of the magnetic attraction of the second electromagnet unit 22. At this point, the armature segment 310 is in a rearward position.

The controller 600 is configured to alternately energize the first and second electromagnet units 21, 22 to cause reciprocating movement of the reciprocating armature 300.

Whether the armature segment 310 in the forward or rearward position, the armature segment 310 can be readily attracted by the first electromagnet unit 21 or the second electromagnet unit 22. This is because the magnetic fields generated by the first and second electromagnet units 21, 22 can overlap inside the coupling stator core 100. As such, the reciprocating movement of the reciprocating armature 300 can be smooth.

Figure 3B:
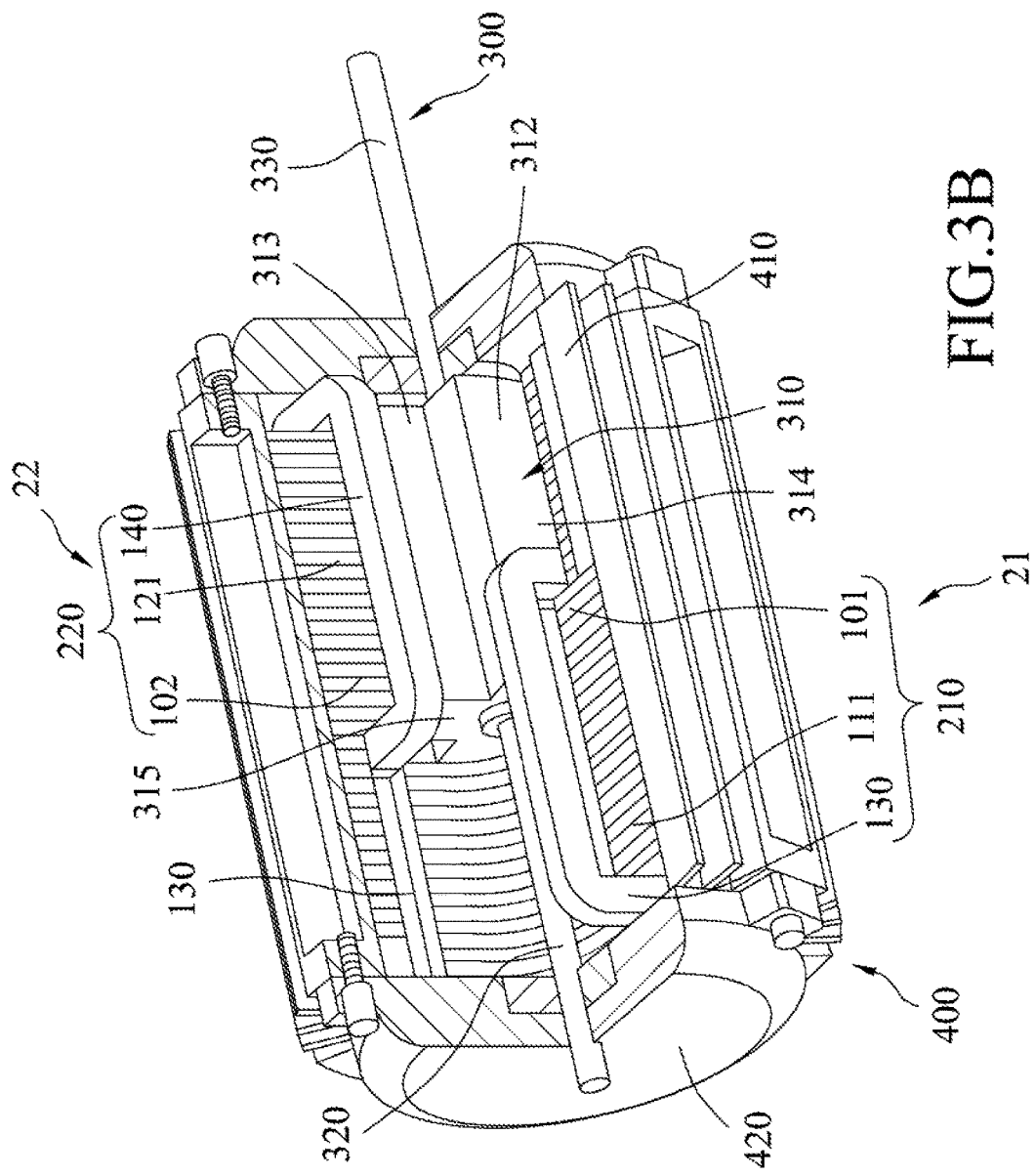
FIG. 3B is similar to FIG. 3A but illustrating that the second elongated pole unit is in register with a second electromagnet unit.

In this embodiment, the front magnetic pole unit 11 includes two front magnetic poles 111 which are diametrically spaced apart from each other, and the rear magnetic pole unit 12 includes two rear magnetic poles 121 which are diametrically spaced apart from each other. The first magnetic pole unit 104 includes two first magnetic poles 101 which are respectively in alignment with the front magnetic poles 111, and the second magnetic pole unit 105 includes two second magnetic poles 102 which are respectively in alignment with the rear magnetic poles 121. The front coil winding unit 13 includes two front coil windings 130 each of which is wound around one of the front magnetic poles 111 and a corresponding one of the first magnetic poles 101 to form a first electromagnet 210. The first electromagnet unit 21 includes two of the first electromagnets 210 (only one is shown in FIGS. 3A and 3B). The rear coil winding unit 14 includes two rear coil windings 140 each of which is wound around one of the rear magnetic poles 121 and a corresponding one of the second magnetic poles 102 to form a second electromagnet 220. The second electromagnet unit 22 includes two of the second electromagnets 220 (only one is shown in FIGS. 3A and 3B). The first elongated pole unit 312 includes two first elongated poles 314 which are radially opposite to each other, and which are moved into register with the first electromagnets 210, respectively (see FIG. 3A), when the first electromagnet unit 21 is energized to the first energized state. In this case, the first electromagnets 210 of the first electromagnet unit 21 are energized by applying an electric current through the front coil windings 130. The second elongated pole unit 313 includes two second elongated poles 315 which are radially opposite to each other, and which are moved into register with the second electromagnets 220, respectively (see FIG. 3B), when the second electromagnet unit 22 is energized to the second energized state. In this case, the second electromagnets 220 of the second electromagnet unit 22 are energized by applying an electric current through the rear coil windings 140.

The number of the stator cores can be increased so as to allow the reciprocating armature 300 to have a longer stroke length.

Figure 4A:
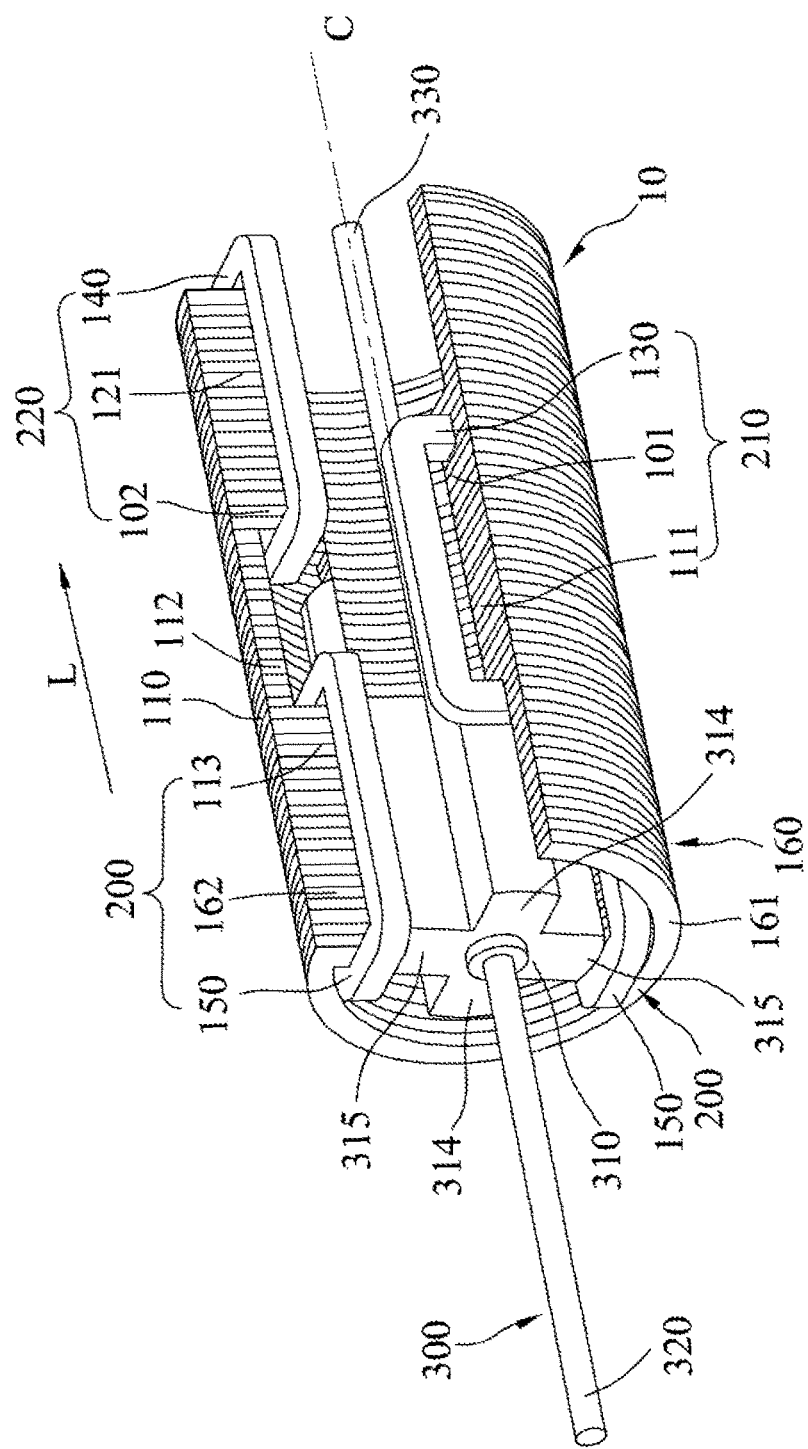
FIG. 4A is a perspective, partially cut-out view of a reciprocating electric motor according to a second embodiment of the disclosure with a housing omitted, in which a second elongated pole unit is in register with a third electromagnet unit.
Figure 4B:
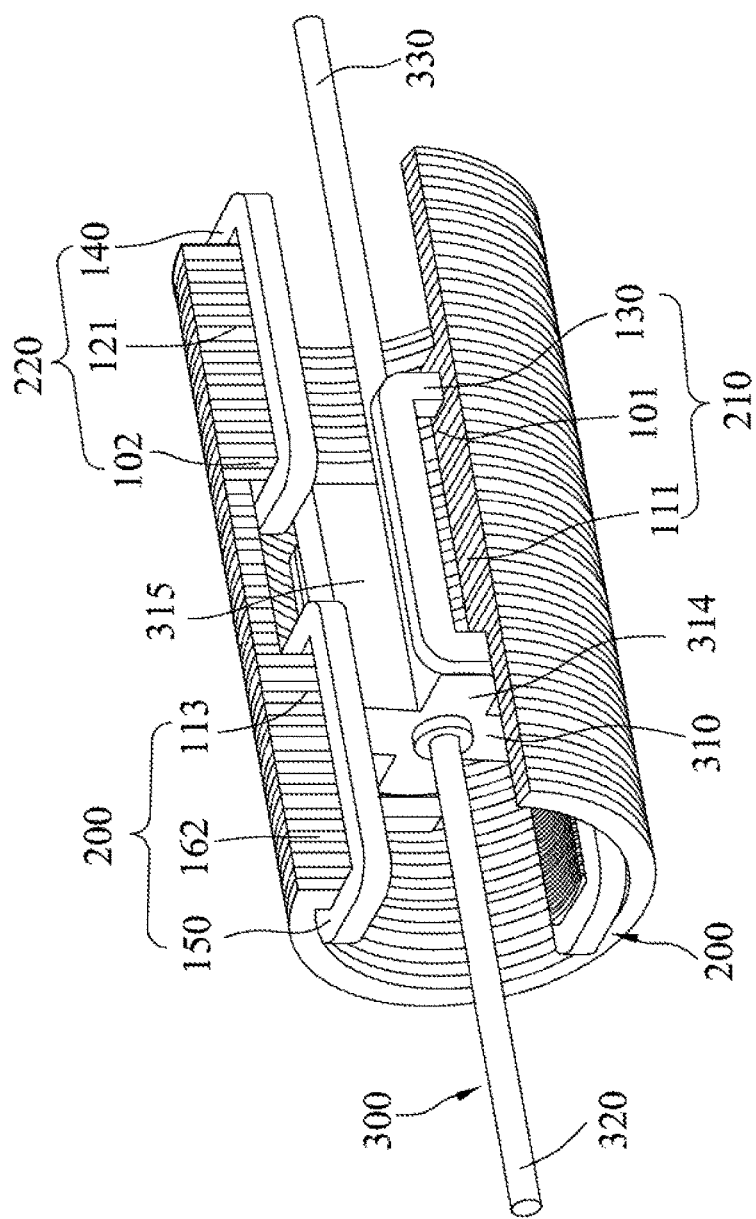
FIG. 4B is similar to FIG. 4A but illustrating that a first elongated pole unit is in register with a first electromagnet unit.
Figure 4C:
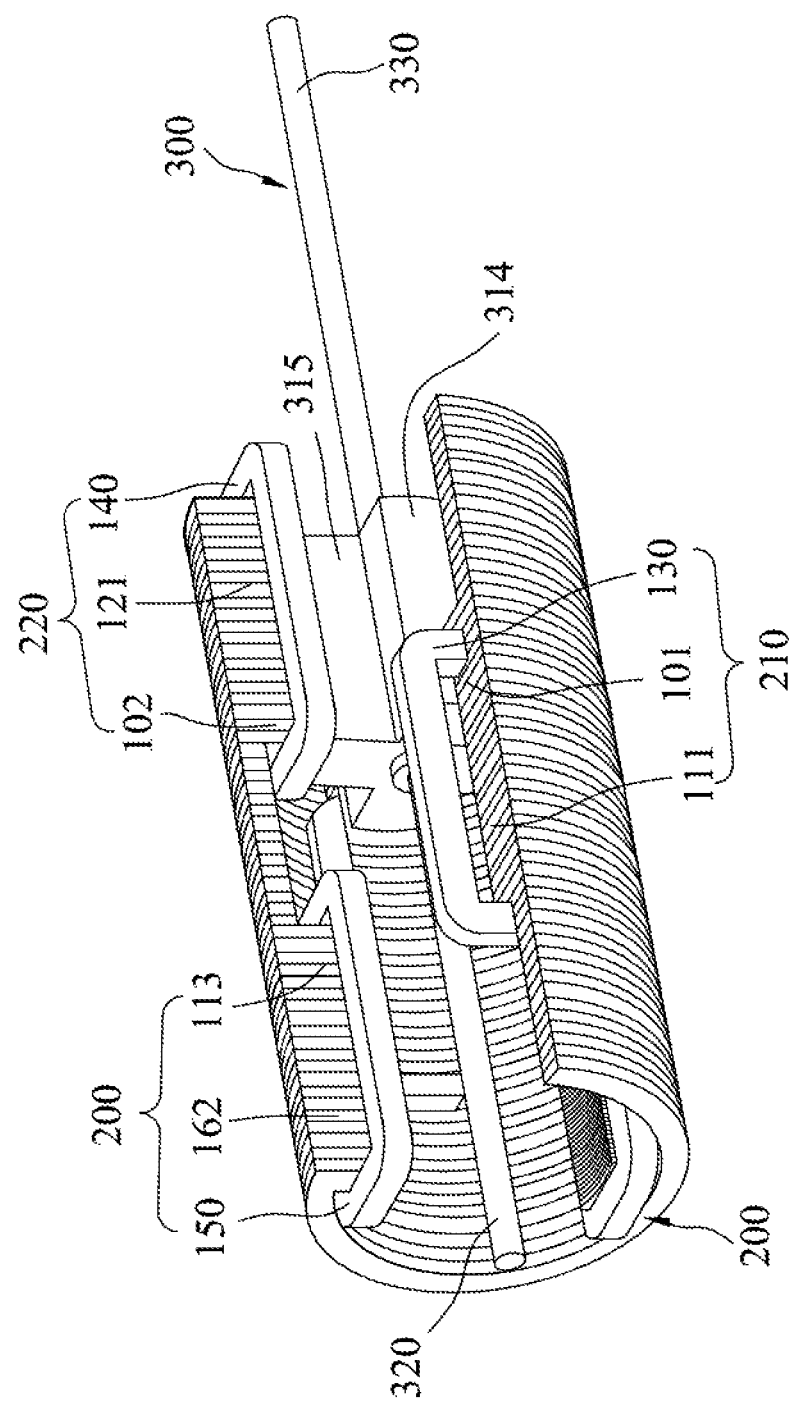
FIG. 4C is similar to FIG. 4A but illustrating that the second elongated pole unit is in register with a second electromagnet unit.

FIGS. 4A, 4B, and 4C illustrate a reciprocating electric motor according to a second embodiment of the disclosure. The second embodiment is similar to the first embodiment, except that the stator member 10 further includes two additional winding coils 150 and an extension stator core 160 disposed forwardly of the front stator core 110, and the front stator core 110 has two auxiliary front magnetic poles 113 (only one is shown in FIG. 4A). The two auxiliary front magnetic poles 113 are disposed on the inner surface of the front tubular segment 112, and extend in the longitudinal direction (L) to be in alignment with and spaced apart from the second magnetic poles 102, respectively. The extension stator core 160 has an extension tubular segment 161 surrounding the central axis (C), and two extension magnetic poles 162 (only one is shown) which are disposed on an inner surface of the extension tubular segment 161, and which are diametrically spaced apart from each other. The extension magnetic poles 162 extend in the longitudinal direction (L) and are in alignment with the auxiliary front magnetic poles 113, respectively. Each of the two additional winding coils 150 is wound around one of the auxiliary front magnetic poles 113 and a corresponding one of the extension magnetic poles 162 to form a third electromagnet 200. In this embodiment, two of the third electromagnets 200 are formed. When the third electromagnets 200 are energized, the second elongated poles 315 are respectively moved into register with the third electromagnets 200 by virtue of the magnetic attraction of the third electromagnets 200.

When the reciprocating armature 300 in a frontmost position (FIG. 4A) is driven to a rearward position (FIG. 4C), the first electromagnets 210 and the second electromagnets 220 are sequentially energized to permit a rearward stroke of the reciprocating armature 300. When the reciprocating armature 300 in the rearward position (FIG. 4C) is driven to the frontmost position (FIG. 4A), the first electromagnets 210 and the third electromagnets 200 are sequentially energized to permit a forward stroke of the reciprocating armature 300. In this embodiment, the controller is configured to control the reciprocating armature 300 to alternately perform the forward and rearward strokes to result in reciprocating movement of the reciprocating armature 300.

Figure 5:
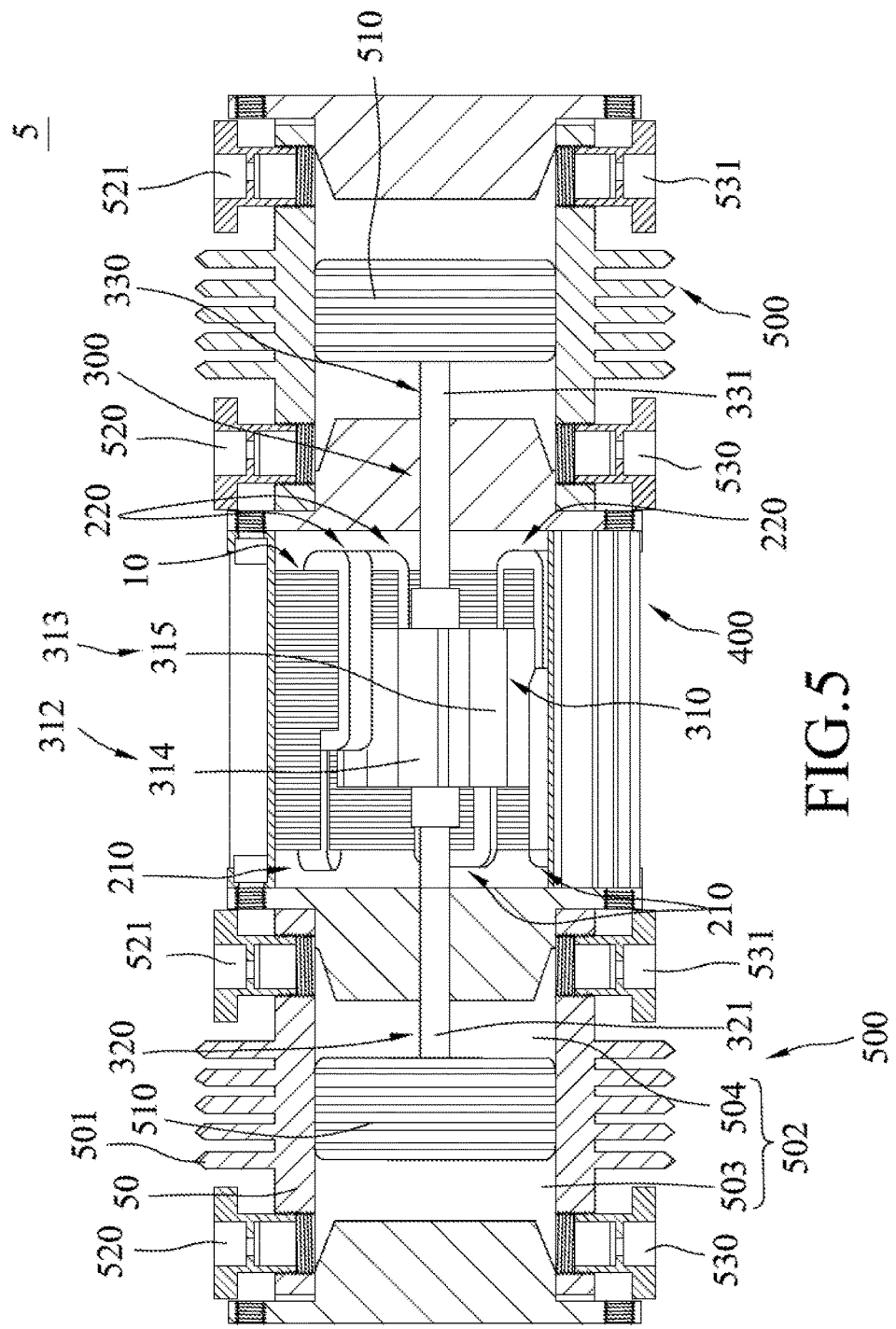
FIG. 5 is a schematic view of a compressor which includes a reciprocating electric motor according to a third embodiment of this disclosure.

FIG. 5 illustrates a compressor 5 which includes two cylinders 500, two pistons 510, and a reciprocating electric motor according to a third embodiment of this disclosure. The reciprocating electric motor of the third embodiment is similar to that of the first embodiment, except that the stator member 10 has four of the first electromagnets 210 and four of the second electromagnets 220. In addition, the first elongated pole unit 312 includes four of the first elongated poles 314, and the second elongated pole unit 313 includes four of the second elongated pole units 315. When the first electromagnets 210 are energized, the first elongated poles 314 are moved into register with the first. electromagnets 210, respectively. When the second electromagnets 220 are energized, the second elongated poles 315 are moved into register with the second electromagnets 220.

The pistons 510 are respectively connected to the front and rear journal regions 321, 331 of the reciprocating armature 300 to be moved with the reciprocating armature 300. Each of the cylinders 500 has a tubular cylinder body 50 and a plurality of fins 501 on an outer surface of the tubular cylinder body 50. The tubular cylinder body 50 of each cylinder 500 defines a main chamber 502 for receiving a corresponding one of the pistons 510. Furthermore, the main chamber 502 of each of the cylinders 500 is divided into front and rear sub-chambers 503, 504 by the corresponding one of the pistons 510. Each of the cylinders 500 has front inlet and outlet check valves 520, 530 in fluid communication with the front sub-chamber 503 thereof, and rear inlet and outlet check valves 521, 531 in fluid communication with the rear sub-chamber 504 thereof.

When the first electromagnets 210 are energized, the pistons 510 are forwardly moved with the reciprocating armature 300 to compress fluids in the front sub-chambers 503 of the cylinders 500. At this point, the front outlet check valves 530 of both of the cylinders 500 are opened to permit the compressed fluids in the front sub-chambers 503 to flow out through the front outlet check valves 530, and the rear inlet check valves 521 of both of the cylinders 500 are opened to permit fluids outside the cylinders 500 to be drawn into the rear sub-chambers 504 through the rear inlet check valves 521.

When the second electromagnets 220 are energized, the pistons 510 are rearwardly moved with the reciprocating armature 300 to compress fluids in the rear sub-chambers 504 of the cylinders 500. At this point, the rear outlet check valves 531 of both of the cylinders 500 are opened to permit the compressed fluids in the rear sub-chambers 504 to flow out through the rear outlet check valves 531, and the front inlet check valves 520 of both of the cylinders 500 are opened to permit fluids outside the cylinders 500 to be drawn into the front sub-chambers 503 through the front inlet check valves 520.

Because the reciprocating armature 300 is adapted for linear reciprocating movement and does not perform angular movement, the compressor 5 can be operated with higher energy efficiency and produces less noise when operated. The compressor 5 can be used in, for example, air conditioners of electric cars, dehumidifiers, cold. drink machines, water chillers, refrigerators, home air-conditioners, or any devices with a reciprocating electric motor.

Figure 6A:
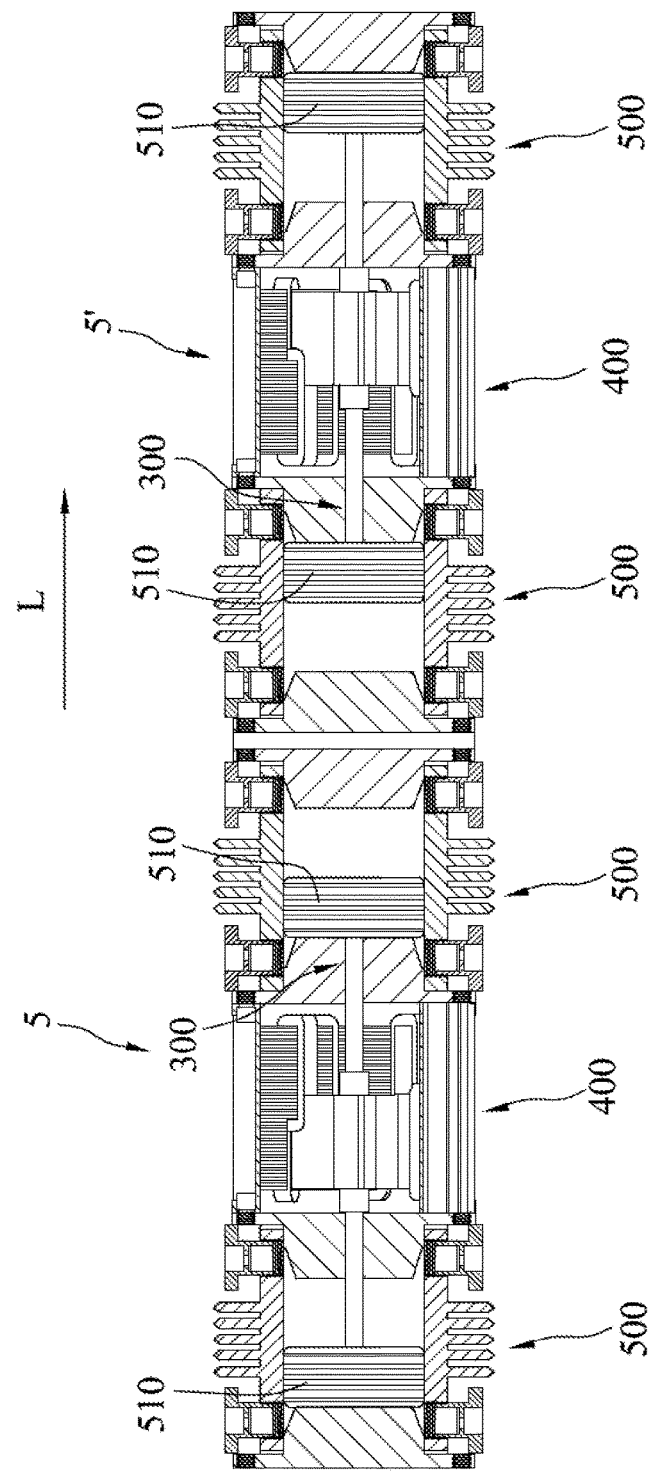
FIGS. 6A and 6B are schematic views of a compressor system including two of the compressors of FIG. 5.
Figure 6B:
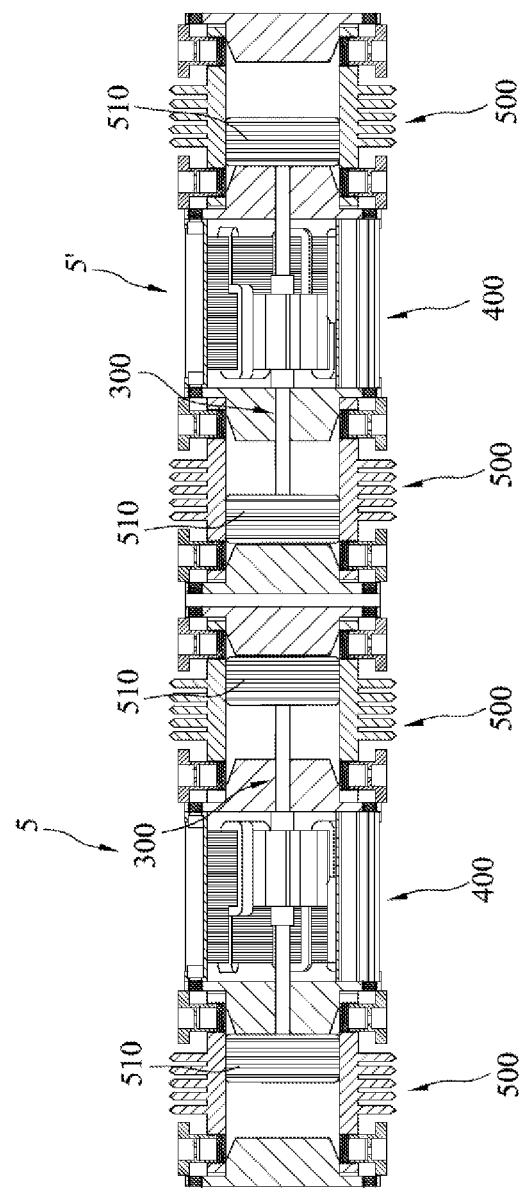

FIGS. 6A and 6B show a compressor system which includes front and rear compressors 5, 5', each of which is substantially the same as that shown in FIG. 5. FIG. 6A illustrates that the pistons 510 of the front compressor 5 move away from the pistons 510 of the rear compressor 5'. FIG. 6B illustrates that the pistons 510 of the front compressor 5 move toward the pistons 510 of the rear compressor 5'. In the compressor system, the rear one of the cylinders 500 of the front compressor 5 is connected to and in alignment with the front one of the cylinders 500 of the rear compressor 5' in the longitudinal direction (L), and thus, impact generated by the reciprocating movement of the reciprocating armature 300 of the front compressor 5 may offset impact generated by the reciprocating movement of the reciprocating armature 300 of the rear compressor 5' to thereby reduce vibration of the compressor system during operation.

Figure 7:
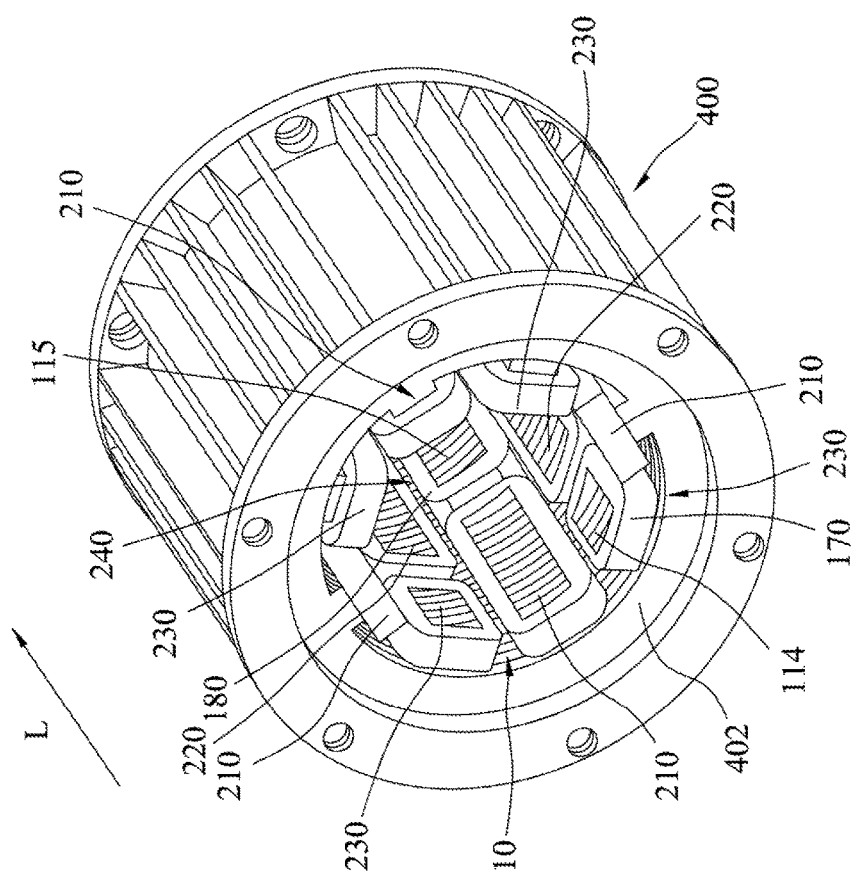
FIG. 7 is a perspective view of a reciprocating electric motor according to a fourth embodiment of the disclosure, illustrating a stator member disposed in a tubular body of a housing.
Figure 8:
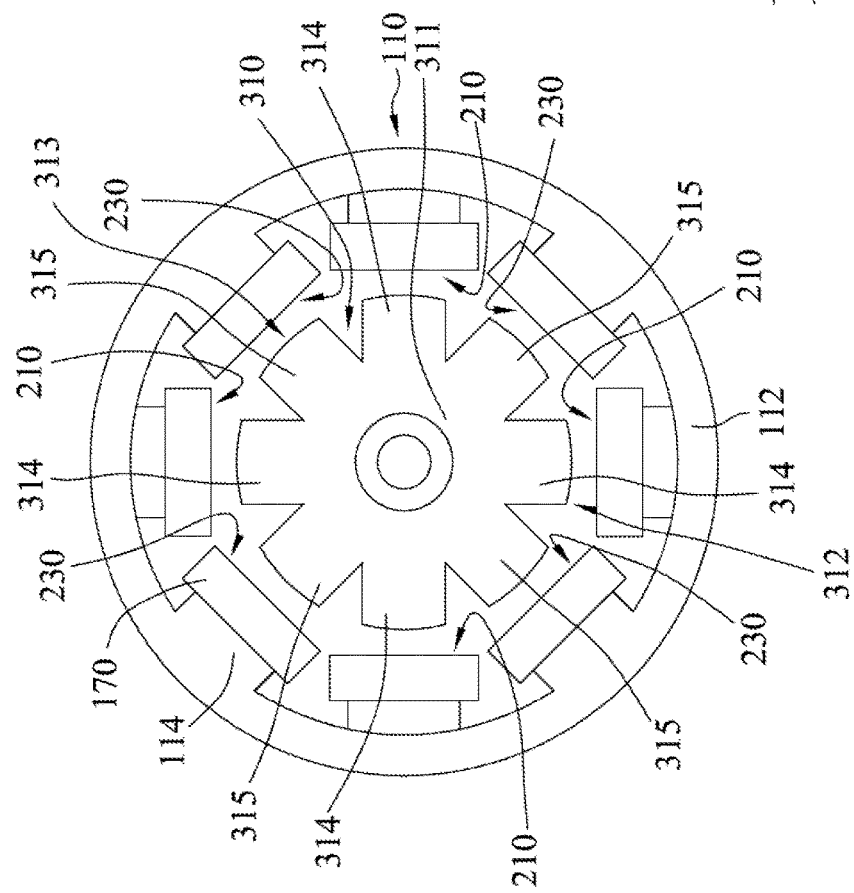
FIG. 8 is a schematic front view of the reciprocating electric motor of the fourth embodiment with a housing omitted.

FIGS. 7 and 8 illustrate a reciprocating electric. motor according to a fourth embodiment of the disclosure. The fourth embodiment is similar to the first embodiment. except that, in the fourth embodiment, the first electromagnet unit 21 includes four of the first electromagnets 210, the second electromagnet unit 22 includes four of the second electromagnets 220, the first elongated pole unit 312 includes four of the first elongated poles 314, and the second elongated pole unit 313 includes four of the second elongated poles 315 which are disposed alternate with the first elongated poles 314. In addition, the stator member 10 further includes four front auxiliary electromagnets 230 and four rear auxiliary electromagnets 240.

The front auxiliary electromagnets 230 are formed by winding front auxiliary coil windings 170 respectively around front auxiliary magnetic poles 114 which are formed on the inner surface of the front tubular segment 112. The rear auxiliary electromagnets 240 are formed. by winding rear auxiliary coil windings 180 respectively around rear auxiliary magnetic poles 115 which are formed on the inner surface of the rear tubular segment 122 (see also FIG. 1).

The front auxiliary electromagnets 230 have dimension smaller than the first electromagnets 210 in the longitudinal direction (L), and are disposed on the inner surface of the front tubular segment 112 in proximity to the front end 402 (see also FIG. 1). The front auxiliary electromagnets 230 are respectively in alignment with and spaced apart from the second electromagnets 220 in the longitudinal direction (L). The first electromagnets 210 and the front auxiliary electromagnets 230 are disposed alternately. The controller 600 (see FIG. 1) is further configured to permit the front auxiliary electromagnets 230 to be energized when the first electromagnets 210 are energized.

The rear auxiliary electromagnets 240 have a dimension smaller than the second electromagnets 220 in the longitudinal direction (L), and are disposed on the inner surface of the rear tubular segment 122 in proximity to the rear end 403 (see also FIGS. 1 and 3A). The second electromagnets 220 and the rear auxiliary electromagnets 240 are disposed alternately. The rear auxiliary electromagnets 240 are respectively in alignment with and spaced apart from the first electromagnets 210 in the longitudinal direction (L). The controller 600 is further configured to permit the rear auxiliary electromagnets 240 to be energized when the second electromagnets 220 are energized.

When the first electromagnets 210 and the front auxiliary electromagnets 230 are energized, the first elongated poles 314 are moved into register with the first electromagnets 210, respectively, and the second elongated poles 315 are moved to face the front auxiliary electromagnets 230, respectively.

When the second electromagnets 220 and the rear auxiliary electromagnets 240 are energized, the second elongated poles 315 move into register with the second electromagnets 220, respectively, and the first elongated poles 314 are moved to face the rear auxiliary electromagnets 240, respectively.

While the disclosure has been described in connection with what are considered the exemplary embodiments, it is understood that this disclosure, is not limited to the disclosed embodiments but is intended to cover various arrangements included within the spirit and scope of the broadest interpretation so as to encompass all such modifications and equivalent arrangements.

What is claimed is:

1. A reciprocating electric motor, comprising
 housing having a tubular body extending along a central axis in a longitudinal direction to terminate at front and rear ends;
 a stator member disposed in said tubular body and including
  a front stator core disposed proximate to said front end, and having a front tubular segment surrounding the central axis, and a front magnetic pole unit which is disposed on an inner surface of said front tubular segment, and which extends in the longitudinal direction,
  a rear stator core disposed proximate to said rear end, and having a rear tubular segment surrounding the central axis, and a rear magnetic pole unit which is disposed on an inner surface of said rear tubular segment, and which extends in the longitudinal direction, said rear magnetic pole unit being angularly displaced from said front magnetic pole unit relative to the central axis,
  a coupling stator core having a ring segment which is disposed between said front and rear tubular segments and which surrounds the central axis, and first and second magnetic pole units which are disposed on an inner surface of said ring segment, and which are angularly displaced from each other such that said first and second magnetic pole units are in alignment with said front and rear magnetic pole units, respectively, a front coil winding unit wound around said front magnetic pole unit and said first magnetic pole unit to form a first electromagnet unit which can be energized to a first energized state, and a rear coil winding unit wound around said rear magnetic pole unit and said second magnetic pole unit to form a second electromagnet unit which can be energized to a second energized state; and a reciprocating armature including front and rear end segments, and an armature segment which is disposed in said tubular body and between said front and rear end segments, and which is formed from a magnetically attractive material, said front end segment extending forwardly from said armature segment to terminate at a front journal region which is journaled forwardly of said front end of said tubular body so as to permit said front end segment to move relative to said housing, said rear end segment extending rearwardly from said armature segment to terminate at a rear journal region which is journaled rearwardly of said rear end of said tubular body so as to permit said rear end segment to move relative to said housing, said armature segment having a central body extending along the central axis, a first elongated role unit which extends in the longitudinal direction and radially from said central body, and which is configured such that when said first electromagnet unit is energized to the first energized state, said first elongated pole unit is moved into register with said first electromagnet unit by virtue of a magnetic attraction of said first electromagnet unit, and a second elongated pole unit which extends in the longitudinal direction and radially from said central body, and which is angularly displaced from said first elongated pole unit, said second elongated pole unit being configured such that when said second electromagnet unit is energized to the second energized state, said second elongated pole unit is moved into register with said second electromagnet unit by virtue of magnetic attraction of said second electromagnet unit.

2. The reciprocating electric motor according to claim 1, wherein said magnetically attractive material of said armature segment is selected from the group consisting of iron, silicon steel, a permanent magnet, and a magnetically permeable material.

3. The reciprocating electric motor according to claim 1, wherein:

said front magnetic pole unit includes two front magnetic poles which are diametrically spaced apart from each other;

said rear magnetic pole unit includes two rear magnetic poles which are diametrically spaced apart from each other;

said first magnetic pole unit includes two first magnetic poles which are respectively in alignment with said front magnetic poles;

said second magnetic pole unit includes two second magnetic poles which are respectively in alignment with said rear magnetic poles;

said front coil winding unit includes two front coil windings each being wound around one of said front magnetic poles and a corresponding one of said first magnetic poles to form a first electromagnet;

said first electromagnet unit includes two of said first electromagnets;

said rear coil winding unit includes two rear coil windings each being wound around one of said rear magnetic poles and a corresponding one of said second magnetic poles to form a second electromagnet;

said second electromagnet unit includes two of said second electromagnets;

said first elongated pole unit includes two first elongated poles which are radially opposite to each other, and which are moved into register with said first electromagnets, respectively, when said first electromagnet unit is energized to the first energized state; and said second elongated pole unit includes two second elongated poles which are radially opposite to each other, and which are moved into register with said second electromagnets, respectively, when said second electromagnet unit is energized to the second energized state.

4. The reciprocating electric motor according to claim 1, wherein said housing further has front and rear end caps which cover said front and rear ends of said tubular body, respectively, said front end cap having a front central hole configured to permit said front journal region to be journaled in said front end cap, said rear end cap having a rear central hole configured to permit said rear journal region to be journaled in said rear end cap.

5. The reciprocating electric motor according to claim 4, said housing further has a plurality of fins which are disposed on an outer surface of said tubular body and extend in the longitudinal direction, and which are displaced from one another in a circumferential direction.

6. The reciprocating electric motor according to claim 1, wherein said front tubular segment, said rear tubular segment, and said ring segment are formed into one-piece.

7. The reciprocating electric motor according to claim 3, wherein said stator member further includes a plurality of front auxiliary electromagnets which are formed on said inner surface of said front tubular segment in proximity to said front end of said tubular body, and which are respectively in alignment with and spaced apart from said second electromagnets in the longitudinal direction, said controller being further configured to permit said front auxiliary electromagnets to be energized when said first electromagnet unit is energized.

8. The reciprocating electric motor according to claim 7, wherein said stator member further includes a plurality of rear auxiliary electromagnets which are formed on said inner surface of said rear tubular segment in proximity to said rear end of said tubular body, and which are respectively in alignment with and spaced apart from said first electromagnets in the longitudinal direction, said controller being further configured to permit said rear auxiliary electromagnets to be energized when said second electromagnet unit is energized.

9. The reciprocating electric motor according to claim 1, further comprising a controller which is configured to alternately energize said first and second electromagnet units to cause reciprocating movement of said reciprocating armature.

* * * * *